Patented Oct. 11, 1927.                                                     1,645,109

UNITED STATES PATENT OFFICE.

SAMUEL P. MARLEY, OF PITTSBURGH, AND WILLIAM A. GRUSE, OF WILKINSBURG, PENNSYLVANIA, ASSIGNORS TO GULF REFINING COMPANY, OF PITTSBURGH, PENNSYLVANIA, A CORPORATION OF TEXAS.

FUEL COMPOSITION.

No Drawing.        Application filed July 28, 1924.  Serial No. 728,769.

This invention relates to fuel compositions; and it comprises a fuel suitable for explosion engines and containing volatile petroleum oils of the nature of gasoline, with an addition of a minimal amount of an alkoxy derivative of an aromatic hydrocarbon, such hydrocarbon also advantageously carrying an amino group in the ortho, para or meta position, but advantageously para, such as phenetidin (the ethyl ether of para amino phenol) or anisidin (the methyl ether of para amido phenol); all as more fully hereinafter set forth and as claimed.

Gasoline in an engine at times gives a "knock"; the tendency toward knocking being greater the higher the compression, the dirtier the engine and the larger the proportion of low volatile oils present. "Knocking" is apparently due to a variety of causes, among which may be mentioned going beyond a certain critical pressure, interference with normal operation by accumulation of carbon in the cylinder of the engine, interference with normal operation due to changes of temperature by variation of efficiency of the cooling system or by the influence of deposits on the outside cooling wall of the cylinder, improperly timed ignition, etc. etc. "Knocking" limits the compression which can be used and, to that extent, the utilization of the thermal units of the fuel. "Knocking" takes place to a greater extent with some oily fuels and to a less extent with others. A wide variety of materials are known which have a beneficial effect upon knocking; that is, in their presence the knocking tendency of the gasoline under knocking conditions is repressed or disappears. Among the best known of these agents is amino benzene (anilin). No great quantity of anilin is necessary to completely restrain the knocking tendency of ordinary commercial gasoline. With one particular gasoline, addition of 3 or 4 per cent by volume of anilin for all practical purposes completely destroys the knocking tendency under knocking conditions. Smaller percentages reduce it substantially proportionately. We have found as small an amount as 2 per cent of anilin is equal, so far as restraining knocking is concerned, to 30 per cent of benzene.

We have found that certain oxygenated derivatives of anilin, that is, of aromatic amino compounds, are much more efficient in restraining knocking than the aromatic amino compounds (such as anilin) themselves. The addition of an oxygenated group on the nucleus of anilin improves it as a knock suppressing agent. Whatever the substituent, it is usually better in the para than in the ortho or meta positions. The best of these substituted bodies are the alkoxy derivatives of amino phenols; the substances which are obtained by replacing the hydrogen of the phenolic hydroxyl by an alkyl group. For example, ordinary phenetidin, which is the ethyl ether of para amino phenol, and ansidin, which is the corresponding methyl ether, are both more efficient than anilin. Butyl and propyl ethers show the same increased efficiency as the methyl and the ethyl ethers. With all these materials, those in which the amino group and the other group are in a para position, as in phenetidin and anisidin, are considerably better than those in which these two groups occupy the ortho and meta positions with regard to each other. But these ortho and meta compounds are also good and useful bodies for the present purposes.

The structures of anisidin and phenetidin are usually represented in the following manner:

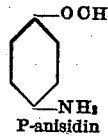
P-anisidin

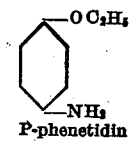
P-phenetidin

In one way of looking at these alkoxy derivatives of the aromatic amino compounds they may be regarded as ethers; phenetidine, for example being ethyl ether with one ethyl group replaced by amino benzene. One or both groups linked by oxygen may be cyclic. It is not necessary that either of the radicals attached to the oxygen should contain substituent groups, since unsubstituted ethers such as alpha naphthyl ethyl ether and beta naphthyl isoamyl ether have been found to be effective.

It will be observed that each of the foregoing materials is a compound which is characterized, in a chemical sense, by the presence of an atom of oxygen, to which is attached an aromatic organic radical or group containing the "benzene ring" or one of its multiples, such as the "naphthalene ring". These radicals are customarily indicated by a grouping of at least six atoms of carbon, arranged in a hexagonal manner. The grouping, —O—, which indicates the presence of an ether, may often be obtained by condensing the corresponding hydroxy-compounds of the radicals present in the final anti-knock material with the elimination of a molecule of water.

With any of the substituted alkoxy bodies mentioned ante, the presence of an extremely small amount in gasoline does away with knocking properties for all practical purposes. The exact amount necessary with each of these bodies depends upon its particular character and upon the particular character of the gasoline used. Less is usually required in using the para derivatives than in using the ortho and the meta. Most of these bodies are directly soluble in gasoline to an extent sufficient for our purposes, excepting anisidin. Anisidin will only dissolve in gasoline of most commercial grades to the extent of about 0.5 per cent; which amount however is sometimes all that is necessary. The exact solubility in gasoline differs considerably with gasoline from different sources; but the 0.5 figure is around the mean. Anisidin is far more effective in restraining knocking than are corresponding proportions of anilin. Commonly, in adding these bodies to gasoline, for convenience in effecting quick incorporation we first dissolve them in any one of various commercial solvents, such as benzol (benzene). This is a convenient way of dealing with the extremely small additions which are used under the present invention; that is, it is convenient to use benzol both as a solvent and as a bulk-increasing body. In the presence of a little benzol, say 2 to 3 per cent, or even 10 per cent, the solubility of these alkoxy bodies in gasoline is quite materially increased. Concomitantly with their influence in restraining knocking, these bodies exert a markedly favorable influence upon the power development. In one particular test with a particular gasoline with a given spark and throttle setting, with a little anisidin in the gasoline, the increase in power was 8 to 10 per cent, while with phenetidin, the increase was much more, being about 30 per cent. While, as stated, the quantities of these addition agents to be added to the gasoline for their anti-catalytic effect will vary with the particular substances used and the particular nature of the gasoline, we do not commonly employ more than about 75 grams per gallon, or about 2.75 per cent by weight with ordinary commercial automobile gasoline of 60° Baumé and we may employ amounts which are considerably less.

As stated, the alkoxy body may be added either directly to the gasoline or in the form of a benzol or other solution of any strength desired.

While we have described our invention more particularly as applied to gasoline of the present commercial grades, it may, of course, be used with kerosene or with other grades of petroleum distillates; and it may in fact be used with any motor fuel having a tendency toward knocking.

What we claim is:

1. As a new composition of matter, motor fuel comprising volatile petroleum oils and an alkoxy derivative of an aromatic amino body.

2. As a new composition of matter, motor fuel comprising votatile petroleum oils and an alkoxy derivative of para amino benzene.

3. As a new composition of matter, a motor fuel comprising volatile petroleum oils and anisidin.

4. As an "anti-knock" compound for use in hydrocarbon motor fuels, the substance

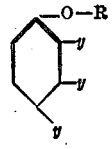

where R is an alkyl group and not more than one y is substituted by an amino group.

5. As a new composition of matter, hydrocarbon motor fuel containing volatile petroleum oils and the substance

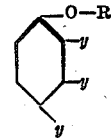

where R may be a methyl, ethyl, propyl or butyl radical and not more than one y is substituted by an amino group.

6. As a new composition of matter, motor fuel comprising volatile petroleum oils having dissolved therein a chemical compound of the type of an ether, said ether comprising an aromatic group and an amino group structurally indicated by the formula

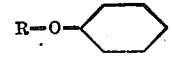

where R is a radical capable of existence in combination with an atom of oxygen to which is also attached an aromatic cyclic radical.

7. As a new composition of matter, motor fuel comprising volatile petroleum oils having dissolved therein a chemical compound of the type of an ether, said ether comprising an aromatic group structurally indicated by the formula

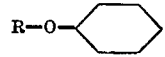

where R is a hydrocarbon radical capable of existence in combination with an atom of oxygen to which is also attached an aromatic cyclic radical comprising a substituted amino group.

8. As a new composition of matter, motor fuel comprising volatile petroleum oils having dissolved therein a chemical compound of the type of an ether, said ether comprising an aromatic group structurally indicated by the formula

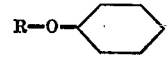

where R is a hydrocarbon radical capable of existence in combination with an atom of oxygen to which is also attached an aromatic cyclic radical comprising a substituted amino group in the para position.

In testimony whereof, we have hereunto affixed our signatures.

SAMUEL P. MARLEY.
WILLIAM A. GRUSE.